(12) United States Patent
Lanfant et al.

(10) Patent No.: US 11,897,170 B2
(45) Date of Patent: Feb. 13, 2024

(54) METHOD AND MOULD FOR PRODUCING AN AERODYNAMIC ELEMENT COMPRISING RIBLETS

(71) Applicant: SAFRAN, Paris (FR)

(72) Inventors: Nicolas Pierre Lanfant, Moissy-Cramayel (FR); Emilie Goncalves, Moissy-Cramayel (FR); Robin Mandel, Moissy-Cramayel (FR)

(73) Assignee: SAFRAN, Paris (FR)

( * ) Notice: Subject to any disclaimer, the term of this patent is extended or adjusted under 35 U.S.C. 154(b) by 243 days.

(21) Appl. No.: 16/093,067

(22) PCT Filed: Apr. 12, 2017

(86) PCT No.: PCT/FR2017/050876
§ 371 (c)(1),
(2) Date: Oct. 11, 2018

(87) PCT Pub. No.: WO2017/178756
PCT Pub. Date: Oct. 19, 2017

(65) Prior Publication Data
US 2019/0202090 A1 Jul. 4, 2019

(30) Foreign Application Priority Data
Apr. 13, 2016 (FR) .................................. 16 53258

(51) Int. Cl.
*B29C 33/42* (2006.01)
*B29C 45/26* (2006.01)

(52) U.S. Cl.
CPC .......... *B29C 33/424* (2013.01); *B29C 45/263* (2013.01); *B29C 2033/422* (2013.01);
(Continued)

(58) Field of Classification Search
CPC ................ B29C 33/424; B29C 45/263; B29C 2033/422; B29C 2045/2697; B64C 2230/26
See application file for complete search history.

(56) References Cited

U.S. PATENT DOCUMENTS

2013/0052412 A1* 2/2013 Fox .................... B29C 43/40 428/139
2013/0062004 A1 3/2013 Amirehteshami et al.
(Continued)

FOREIGN PATENT DOCUMENTS

EP 2 889 114 A1 7/2015
JP 2004-25858 A 1/2004

OTHER PUBLICATIONS

International Search Report dated Jun. 9, 2017, in PCT/FR2017/050876 filed Apr. 12, 2017.
(Continued)

*Primary Examiner* — Larry W Thrower
(74) *Attorney, Agent, or Firm* — Oblon, McClelland, Maier & Neustadt, L.L.P.

(57) ABSTRACT

A mould for obtaining an element is provided. The mould includes an outer face and a plurality of parallel ribs and/or grooves formed on the outer face. One of the walls of the mould includes ribs and/or grooves of which at least a portion of the ribs and/or grooves can be retracted, at least temporarily, such that at least a portion of the surface of the wall is smooth.

8 Claims, 2 Drawing Sheets

(52) U.S. Cl.
CPC .. *B29C 2045/2697* (2013.01); *B64C 2230/26* (2013.01); *Y02T 50/10* (2013.01)

(56) References Cited

U.S. PATENT DOCUMENTS

2014/0091488 A1  4/2014  Ozaki
2014/0262015 A1  9/2014  Palmieri et al.

OTHER PUBLICATIONS

French Preliminary Search Report dated Dec. 13, 2016, in French Application No. 16 53258 filed Apr. 13, 2016.
U.S. Appl. No. 15/773,366, filed May 3, 2018, Nicolas Pierre Lanfant.

* cited by examiner

METHOD AND MOULD FOR PRODUCING AN AERODYNAMIC ELEMENT COMPRISING RIBLETS

TECHNICAL FIELD

The invention relates to a mould for producing an aerodynamic element, such as for example an aircraft wing panel or a turbo-engine blade, which includes a succession of ribs and grooves oriented parallel with the air stream.

The invention relates more particularly to a mould for producing ribs/grooves integral with the rest of the aerodynamic element.

STATE OF THE RELATED ART

With a view to enhancing the aerodynamic performances of an aircraft, it has been proposed to add ribs and/or grooves on the external face of the wings for example.

These ribs/grooves, commonly referred to as "Riblets" are oriented parallel with the direction of flow of the air stream and are arranged on the external surface of the wing.

Riblets have commonly, but not restrictively, a height and a width wherein the value is of the order of 10 to 50 microns and extend longitudinally over the bulk of the aerodynamic element.

They have the effect of reducing fluid friction on the surface of the aerodynamic elements and, consequently, decreasing the drag induced. This makes it possible to enhance the aerodynamic performances.

According to a first embodiment, the riblets are formed on a film which is subsequently affixed on the external face of the aerodynamic element, particularly by bonding.

Such an embodiment makes it possible to manufacture the riblets readily on a flexible panel which is relatively easy to affix on the aerodynamic element.

However, this embodiment involves numerous steps in the production process and also increases the final mass of the aerodynamic element, particularly due to the presence of attachment means such as adhesive layers.

A further embodiment of the riblets is that of forming them in the body of the aerodynamic element.

Indeed, the aerodynamic element is generally produced by moulding, particularly from composite material, the riblets may thus be formed during this moulding operation.

The document US-A-2013/0062004 describes an example of a method for moulding the elements with the riblets in one piece.

According to this method, a wall of the mould includes complementary ribs and/or grooves of those forming the riblets. The resin coming into contact with this wall then comprises raised-surface shapes forming the riblets.

During a resin injection step, and according to the orientation of the riblets with respect to the direction of flow of the resin in the mould, it may arise that the ribs and grooves formed in the wall of the mould have a non-parallel orientation to the resin flow.

As a result, turbulences may be formed at the tips of the ribs and the resin may have difficulty flowing to the bottom of the grooves.

This then results in incomplete riblet formation, which will subsequently impede the efficiency thereof.

Also, the design of the aerodynamic element including riblets may imply that, during the mould release operation, the movement of the aerodynamic element with respect to the mould is not always locally normal to the surface including the riblets.

As such, during the mould release operation, shear stress is produced on the riblets, which may result in the tips of the ribs forming the riblets being damaged and hence, the efficiency of the riblets is affected thereby.

The aim of the invention is that of proposing a mould and a moulding method intended to produce fully formed riblets which are not liable to be damaged during the production process.

DESCRIPTION OF THE INVENTION

The invention relates to a mould for obtaining an element including an external face and a plurality of ribs and/or grooves on said external face, characterised in that one of the walls of the mould includes ribs and/or grooves wherein at least a portion of the ribs and/or grooves are suitable for being retracted at least temporarily so that at least a portion of the surface of said wall is smooth.

The integration in the mould wall of retractable ribs makes it possible to have at least on a portion of the mould wall a smooth surface during the flow of the resin, limiting the appearance of a turbulent flow at the level of the riblets to be obtained. Also, the retraction of the nerves permits that they are not liable to catch against the riblets formed during the mould release operation.

Preferably, said mould wall includes a piezoelectric coating which is suitable for being deformed to have either a smooth surface, or a surface including said complementary ribs and/or grooves of the grooves and ribs of the external face of the element.

Preferably, the piezoelectric coating is suitable for having the surface including the ribs and/or the grooves when it is subjected to an electric current and having the smooth surface when it is not subjected to any current.

Preferably, the piezoelectric coating is suitable for having the smooth surface when it is subjected to an electric current and having the surface including the ribs and/or the grooves when it not subjected to any current.

Preferably, the piezoelectric coating is produced based on PZT lead titanate zirconate ceramic preferably having the chemical formula Pb Zrx,Ti-x O.

Preferably, the mould includes means for supplying the coating with electric current intended to trigger the deformation of the piezoelectric coating.

The invention also relates to a method for moulding an element including an external face and a plurality of ribs and/or grooves formed on said external face, using a mould according to any one of the preceding claims, characterised in that it includes:
a step for supplying the mould with material intended to form said element during which the ribs and/or the grooves of the mould wall are retracted so that said wall has a smooth surface;
a step during which the ribs and/or the grooves of the mould wall are deployed which is carried out prior to the setting of the material;
a step for setting the material during which the ribs and/or the grooves of the mould wall are kept in the deployed position thereof
a step for releasing the element formed from the mould.

Preferably, the method includes a step during which the ribs and/or the grooves of the mould wall are retracted, which is carried out after the step for setting the material and prior to the mould release step.

Preferably, said material intended to form the elements is a resin which is cast during the supply step, and which is polymerised during the setting step.

The invention also relates to an aerodynamic element including an external face and a plurality of ribs and/or grooves formed on said external face, which is obtained using a mould according to the invention in a method according to the invention, characterised in that the ribs and/or the grooves are formed on one or a plurality of parts of the external face which are mutually distinct.

Preferably, said ribs and/or grooves of the element are parallel with a longitudinal direction of flow of an air stream along said external face.

BRIEF DESCRIPTION OF THE FIGURES

Further features and advantages of the invention will emerge on reading the following detailed description, for the comprehension whereof reference will be made to the appended figures wherein.

DETAILED DESCRIPTION OF PARTICULAR EMBODIMENTS

Figure 1:
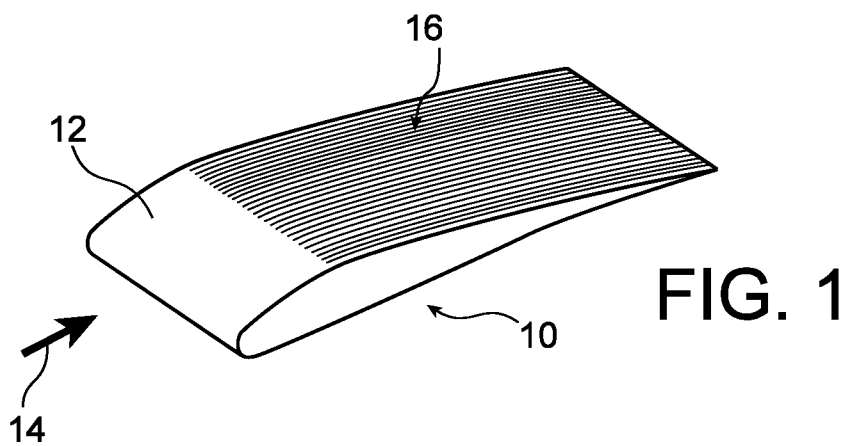
FIG. 1 is a schematic perspective representative of an aircraft wing including riblets produced according to the invention.

In FIG. 1 an aerodynamic element 10 has been represented which consists herein of a section of an aircraft wing.

This element 10 includes an external face 12, herein the upper surface face, whereon an air stream 14 circulates longitudinally.

In order to enhance the aerodynamic efficiency of the element 10, riblets 16 are formed on the external face 12 of the element 10.

Figure 2:
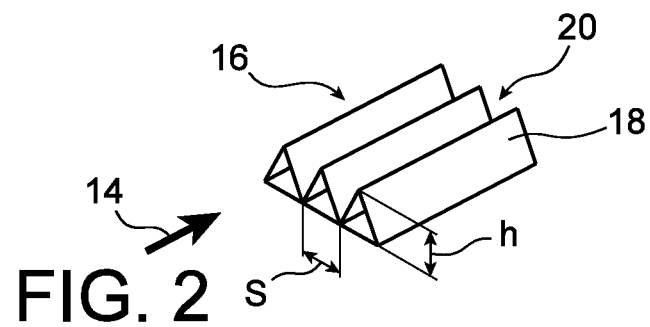
FIG. 2 is a detailed view on a larger scale of an example of embodiment of riblets.

As can be seen in more detail in FIG. 2, the riblets 16 consist of a succession of ribs 18 and grooves 20 which are oriented longitudinally, i.e. parallel with the direction of circulation of the air stream 14 on the external face 12.

According to the embodiment described hereinafter, the riblets 16 consist of ribs 18 and grooves 20 which are parallel with one another and parallel with the longitudinal direction of circulation of the air stream 14. This embodiment is intended to provide the element 10 with good aerodynamic efficiency.

It will be understood that the invention is not limited to an element 10 having an aerodynamic function and that the element 10 may also have any other function, such as for example a decorative function, as is for example the case for a motor vehicle dashboard panel.

As such, the ribs 18 and the grooves 20 may have a non-rectilinear shape and/or not be parallel with one another and with a main longitudinal direction.

Herein, the height "h" and the width "s" of the ribs 18 and the grooves 20 are very small, i.e. of the order of 10 to 50 microns. It will be understood that the invention is not limited to these sizes of the riblets which may consequently be larger or smaller.

The cross-section of the riblets 16 is herein triangular. It will be understood that the invention is not limited to this shape of the riblets, which may be, by way of non-restrictive example, trapezoidal or crenelated.

The longitudinal length of the riblets is defined according to the length of the external face 12 whereon said riblets are formed.

According to a further aspect of the element 10, the riblets 16 are formed on one portion only or on a plurality of portions of the external face 12 of the element 10. In the case of a plurality of portions including riblets 16, these portions are separate and situated at a distance from one another.

The span of each portion, i.e. the number and dimensions of the riblets thereon, is further defined according to the aerodynamic effect to be obtained.

In the description hereinafter, reference will be made to a moulding method by injecting resin into a mould 22 to produce the element 10. Herein also, it will be understood that the invention is not limited to such a method for producing the element 10. As such, the element 10 may also be produced by any other method using a mould 22 such as for example stamping.

This mould 22, represented in FIGS. 3 to 6, delimits a volume 24 which is complementary to the element 10 to be obtained.

The mould 22 includes a wall 26 intended to produce the riblets 16. This wall 26 is as such situated at the level of the face 12 of the element 10 to be obtained, which includes the riblets 16 to be obtained.

Figure 5:
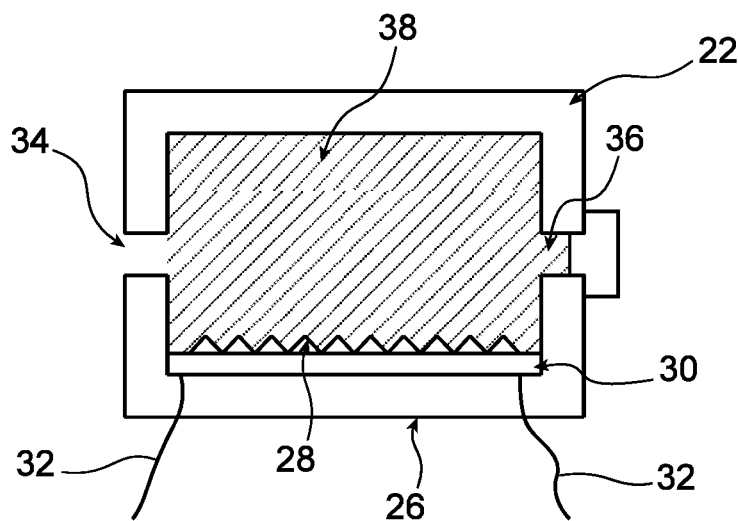

For the formation of the riblets 16, the wall 26 of the mould 22 includes, as can be seen in FIG. 5, ribs and grooves 28 which are complementary to the ribs 18 and the grooves 20 forming the riblets 16.

As such, when the element 10 to be obtained includes ribs 18 and grooves 20 parallel with the longitudinal direction, the ribs and grooves 28 of the wall 26 of the mould 22 are also oriented parallel with one another and with the longitudinal direction.

On the other hand, when the element 10 includes ribs 18 and grooves 20 which are not parallel and/or longitudinal, the ribs and grooves 28 of the wall 26 of the mould 22 are formed accordingly.

According to the invention, the ribs and/or the grooves 28 of the wall 26 of the mould 22 are retractable, i.e. they are suitable for changing state between a configuration for which they protrude with respect to the wall 26 of the mould 22 and a configuration for which they are either set back, or flush with respect to the wall 26 of the mould.

According to one preferred embodiment of the invention, the wall 26 is covered with a piezoelectric coating 30 which is suitable for forming the ribs and/or the grooves 28 of the wall 26. This coating 30 is suitable for being deformed when an electric current is applied thereto to have either a smooth surface, or a surface including ribs and/or grooves 28.

Figure 3:
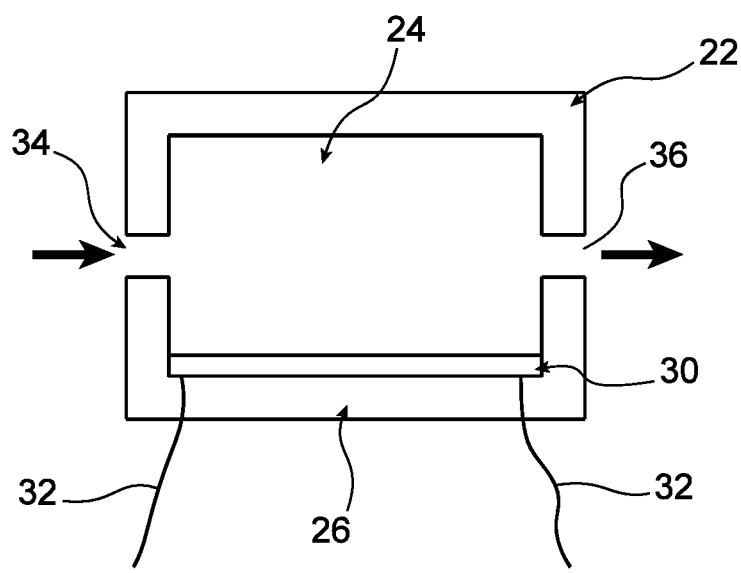
FIGS. 3 to 6 represent an installation for producing an aerodynamic element produced according to the invention shows the status thereof at various steps of the production process.

As such, as can be seen in particular in FIG. 3, according to one configuration, the coating 30 has a smooth surface and as represented in FIG. 5, in a further configuration, the coating 30 has a surface formed from the ribs and/or grooves 28.

As such, when the ribs and/or the grooves 28 of the wall 26 are retracted, the wall 26 of the mould has a smooth surface which is not liable to produce turbulences during the supply of the mould 22 with the material intended to form the element 10. On the other hand, when the mould 22 is filled with material, the coating 30 is placed in the configuration thereof wherein the ribs and/or the grooves 28 of the wall 26 protrude, to form the riblets 16.

According to one alternative embodiment, only a portion of the ribs and/or the grooves 28 of the wall 26 of the mould 22 are retractable.

In this case, only the portion of the wall 26 of the mould 22 at the level whereof the retractable ribs and/or grooves 28 are situated is covered with the piezoelectric coating 30

According to one preferred embodiment, the coating 30 consists of a PZT (lead titanate zirconate) ceramic having a chemical formula Pb(Zrx,Ti1-x)O3. A plurality of compositions are possible by varying the Zr/Ti content.

The coating 30 is presented in the form of a thin film or of a polymerised gel which is deposited on the wall 26 of the mould 22 according to a method such as sol-gel, cathode sputtering, MOCVD (Metal-Organic Chemical Vapour Deposition) or laser ablation.

This material offers the advantage that the temperature resistance is greater than 300° C., which makes it a compatible material with injection/polymerisation cycles of pieces produced from polymerised resin.

According to a first embodiment, the coating 30 has a smooth surface when it is subjected to an electric current of a predefined value and it has a surface formed by ribs and/or grooves 28 when no current is applied thereto.

According to a second embodiment, the coating 30 has a smooth surface when no current is applied thereto and it has a surface formed by ribs and/or grooves 28 when it is subjected to an electric current.

The mould includes wires 32 intended for the electrical power supply of the coating 30 so as to carry out the deformation thereof towards one or the other of the two configurations thereof.

In FIGS. 3 to 6, the mould 22 according to the invention has been represented in various steps of a method for producing the product 10.

Herein, the product 10 is produced by injecting resin. The mould 22 includes for this purpose a port 34 intended to be connected to a nozzle for injecting the resin and a vent 36 intended for discharging the air present in the internal volume 24 of the mould, as the resin is injected.

According to a first step of the method, represented in FIG. 3, the mould 22 is fitted, with the coating 30 covering the wall 26.

The coating 30 is placed in the configuration thereof wherein it has a smooth surface, i.e. the ribs and/or the grooves 28 are not visible. For this, the value of the electric current applied thereto is either equal to the predefined value or it is nil, according to the embodiment of the coating.

Figure 4:
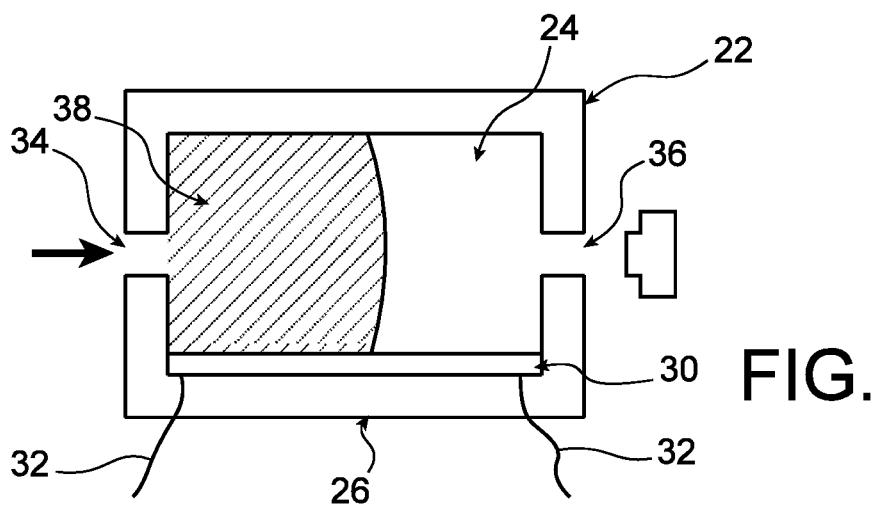

According to a second step of the method represented in FIG. 4, the material intended to form the product 10, i.e. herein the resin 38, is injected into the mould 22 via the injection port 34. The vent 36 remains open to enable the discharge of air.

Also, during this second step, the coating 30 is kept in the smooth configuration thereof wherein the ribs and/or the grooves 28 are retracted, i.e. the value of the current applied on the coating 30 is unchanged.

As such, during the injection of the resin 38, there are no turbulences in the flow thereof at the level of the wall 26. There is therefore no risk of the presence of porosities in the material.

Following this second step, the entire internal volume 24 of the mould 22 is filled with the resin 38. Also, the coating 30 is fully covered by the resin 38, without the presence of air bubbles between the coating 30 and the resin 38.

According to a third step of the method, represented in FIG. 5, the injection port 34 and the vent 36 of the mould 22 are sealed to prevent the outflow of resin 38 from the mould 22 and maintain the pressure in the mould, or to apply a boost pressure so as to compensate for resin shrinkage phenomena.

During this step, the resin 38 is still fluid, it may be shaped further.

As such, during this third step, the shape of the coating 30 is modified so that the coating 30 changes from the state that it had during the first steps and wherein it has a smooth surface to the state represented in FIG. 5 wherein it has complementary ribs and/or grooves 28 to the riblets 16.

This modification of the coating 30 is obtained by changing the current circulating via the electrical wires 32 supplying power to the coating 30. As such, the value of the current becomes nil if the coating 30 was supplied with power to have the smooth shape, or it becomes equal to a predefined value if the coating was not supplied with power.

Following this third step, and as can be seen in FIG. 5, the resin which has not yet been polymerised is set to the shape of the element 10 to be obtained.

A fourth step of the method consists of polymerising the resin 38 so that it sets and adopts the definitive shape thereof.

The polymerisation consists of subjecting the resin 38 to predefined pressure and temperature conditions, for example a temperature greater than 150 degrees Celsius, for a predefined time.

During this fourth step, the coating 30 is kept in the shape thereof wherein it has complementary ribs and/or grooves 28 of the riblets 16 so as to imprint on the resin 38 the shapes intended to form the riblets 16.

As such, following the fourth step, the resin has polymerised, it has changed state to become solid. The element 10 is then formed and it includes the riblets 16 on the external face 12 thereof.

Figure 6:
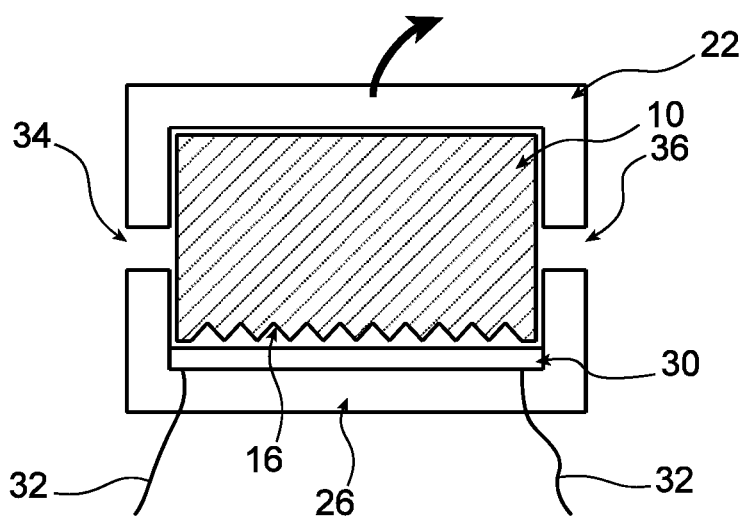

The method includes a fifth step represented in FIG. 6, which consists of removing the element 10 formed in this way from the mould 22.

A first phase of this fifth step consists of retracting the ribs and/or the grooves 28 again, so that the coating 30 has a planar surface.

This retraction of the ribs and/or grooves 28 is intended to detach the ribs and grooves 18, 20 forming the riblets 16 from the ribs and the grooves 28 of the coating 30.

Then, in a second phase of this fifth step, the element 10 is removed from the mould 22.

Since the ribs and/or the grooves 28 of the coating 30 are retracted, they are not liable to catch on the riblets 16, the risks of damaging the riblets 16 during mould release are therefore reduced.

The invention claimed is:

1. A mould intended to carry out a method to obtain an element including an external face and a plurality of at least one of ribs or grooves formed on said external face,
  wherein a wall of the mould includes at least one of ribs or grooves, and at least a portion of the at least one of the ribs or the grooves of said wall are suitable for being retracted at least temporarily so that at least a portion of a surface of said wall is smooth,
  wherein said at least a portion of the at least one of the ribs or the grooves of said wall are suitable for being deployed at least temporarily after being retracted, and
  wherein the method comprises:
    supplying the mould with material intended to form said element during which at least one of the ribs or the grooves of the wall of the mould are retracted so that said wall has a smooth surface;
    deploying at least one of the ribs or the grooves of the wall of the mould;

setting the material during which at least one of the ribs or the grooves of the wall of the mould are kept in a deployed position thereof;

retracting at least one of the ribs or the grooves of the wall of the mould; and releasing the element formed from the mould, and wherein said wall of the mould includes a piezoelectric coating which is suitable for being deformed to have either a smooth surface, or a surface including said the at least one of the ribs or the grooves complementary of the grooves and ribs of the external face of the element.

2. The mould according to claim 1, wherein the piezoelectric coating is suitable for having the surface including the at least one of the ribs or the grooves when the piezoelectric coating is subjected to an electric current and having the smooth surface when the piezoelectric coating is not subjected to any current.

3. The mould according to claim 1, wherein the piezoelectric coating is suitable for having the smooth surface when the piezoelectric coating is subjected to an electric current and having the surface including the at least one of the ribs or the grooves when the piezoelectric coating is not subjected to any current.

4. The mould according to claim 1, wherein the piezoelectric coating is produced based on PZT (lead titanate zirconate) ceramic.

5. The mould according to claim 1, further comprising means for supplying the coating intended to trigger the deformation of the piezoelectric coating.

6. The mould according to claim 1, wherein the piezoelectric coating is fixed to the wall of the mould and is configured to be change between a first condition in which the surface of the wall of the mould is smooth and a second condition in which the surface of the wall of the mould includes said the at least one of the ribs or the grooves complementary of the grooves and ribs of the external face of the element.

7. The mould according to claim 4, wherein the PZT (lead titanate zirconate) ceramic has the chemical formula $Pb(Zr_x, Ti_{1-x})O_3$.

8. The mould according to claim 1, wherein said at least a portion of the at least one of the ribs or the grooves of said wall are suitable for being retracted after being deployed.

\* \* \* \* \*